United States Patent [19]

Davis

[11] Patent Number: 5,907,619

[45] Date of Patent: May 25, 1999

[54] SECURE COMPRESSED IMAGING

[75] Inventor: Derek L. Davis, Phoenix, Ariz.

[73] Assignee: Intel Corporation, Santa Clara, Calif.

[21] Appl. No.: 08/770,563

[22] Filed: Dec. 20, 1996

[51] Int. Cl.$^6$ .................................................. H04L 9/00
[52] U.S. Cl. .............................. 380/23; 380/4; 380/5; 380/9; 380/25; 380/29; 380/30; 380/49
[58] Field of Search .................................. 380/3, 4, 5, 6, 380/7, 8, 9, 10, 23, 25, 49, 50, 54, 59, 29, 30

[56] References Cited

U.S. PATENT DOCUMENTS 5,499,294  3/1996  Friedman ................................. 380/10

5,721,788  2/1998  Powell et al. ......................... 380/54 X

*Primary Examiner*—Bernarr E. Gregory
*Attorney, Agent, or Firm*—Blakely, Sokoloff, Taylor & Zafman

[57] ABSTRACT

A secure method and apparatus for compressing and digitally signing compressed video data. The apparatus compresses video data and permits signing of the compressed video image in such a way that if only a portion of the video image is successfully transmitted, the digital signature corresponding to that portion can still be verified. An optimization scheme which allows the verification of portions of a successful digital transmission with using only one digital signature is also disclosed.

20 Claims, 5 Drawing Sheets

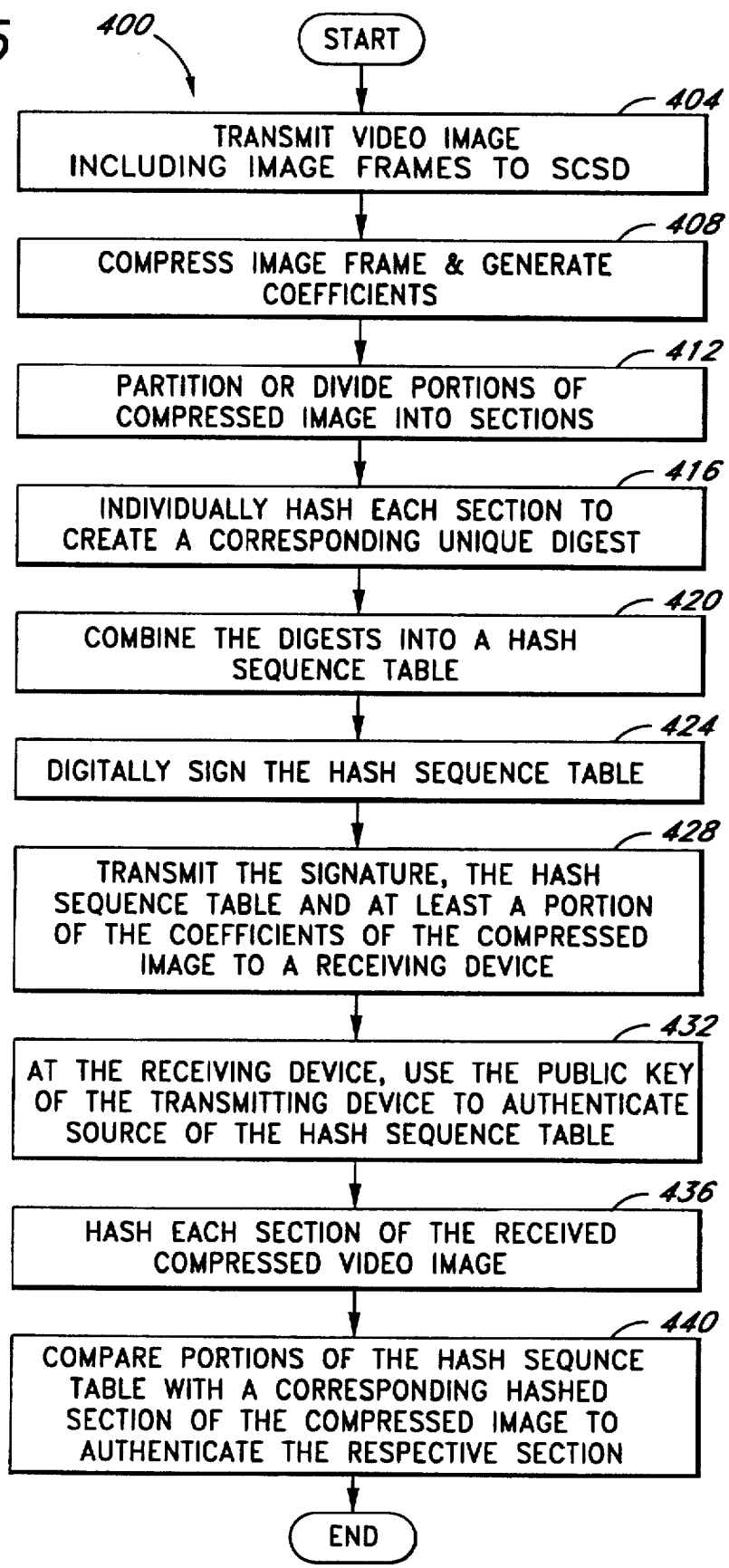

SECURE COMPRESSED IMAGING

BACKGROUND OF THE INVENTION

1. Field of the Invention

The present invention relates generally to verifying the source of digital graphic information being transmitted. More particularly, the present invention relates to compressing data and attaching a digital signature to the compressed data. The invention is useful in authenticating compressed data when lossy compression techniques are used or when transmission is interrupted.

2. Description of Related Art

In recent years, on-line service providers as well as Internet sources have provided increasingly detailed graphical images to computer users. Since these images are data intensive and are transmitted over a communication link of limited bandwidth, often standard two-pair telephone lines, various compression techniques have been used.

One of the most popular compression techniques involves breaking an image into components and transmitting the components sequentially. The components may be coefficients of a discrete cosine transform. A receiving device, usually a personal computer, receives these coefficients and uses them to progressively render the image. The more significant (or "higher order") coefficients provide the initial low-resolution image while lesser significant (or "lower order") coefficients subsequently refine the image and provide additional resolution.

During transmission of the graphical images, data loss may occur. For example, bandwidth or time limitations force termination of a transmission over the communication link. Despite the data loss resulting from a truncated transmission, a lower resolution, but usable image, may be displayed. Moreover, even when the transmission is complete, data loss may still occur if lossy compression techniques are used. "Lossy compression techniques" are compression methods which sacrifice exact replication of an image in order to achieve additional compression. Lossy compression is unacceptable for compressing certain data, such as executable computer code where even a one bit change results in nonexecutable code. However, for video data, it is sometimes worthwhile to sacrifice absolute pixel accuracy for additional compression of data. Lossy compression techniques are particularly useful in compressing an image where the additional compression is significant in reducing storage space required by the image, as well as reduced bandwidth transmissions of the image.

In casual viewing of an image, minor losses which result from lossy compression techniques are often insignificant. However, such losses can be significant for authentication techniques where it is important to verify the source of the image. Standard authentication procedures require that digital data be signed with a digital signature to verify the source of video image. However, after signing the data, any further modification, post-processing or manipulation of the data which results in data loss will invalidate the signature.

Because digital signaturing techniques are rendered useless if even one bit is changed, there exists a need for a method by which the authenticity of data can be determined, even when an incomplete data set is transmitted or when lossy compression techniques are used prior to transmission.

SUMMARY OF THE INVENTION

A method and apparatus for compressing and digitally signing an image frame such that even if only a portion of the image frame is received by a receiving device, the source of the image can still be verified using a digital signature. The invention first compresses the image and divides the compressed data into at least two sections. Each section of compressed data is individually hashed to produce digests corresponding to the sections. The digests are concatenated to produce a hash sequence table which is digitally signed for subsequent authentication. The hash sequence table and digital signature of the hash sequence table are transmitted to a receiving device such that, if the transmission is terminated before the entire image frame has been received, the receiving device can still authenticate the received portion of data.

BRIEF DESCRIPTION OF THE DRAWINGS

The advantages of the present invention will become more readily apparent to those ordinarily skilled in the art after reviewing the following detailed description and accompanying drawings, wherein:

FIG. 5 is a illustrative flow chart showing the steps taken by the preferred embodiment of the digital signing device.

DESCRIPTION OF THE PREFERRED EMBODIMENT

The present invention relates to a method and apparatus for securely compressing video information and verifying the source of the compressed information. In the following description, some terminology is used to discuss certain well known cryptographic functions. For example, an "image frame" is information digitized into binary data acquired for transmission as video, audio or text. A hash function (or the operation of hashing) is the conversion of variable length data input into a fixed length output. The hash function is a "one way function", thus applying the hash function to the data output will not reproduce the data input. A "key" is an encoding and/or decoding parameter used by conventional cryptographic algorithms; mainly, Rivest, Shamir and Adleman ("RSA"), data encryption algorithm ("DEA") as specified in data encryption standard ("DES") and the like. A "digest" is data grouped into a fixed size, normally less than 200 bits. A "sending device" is an apparatus which outputs images to a remotely located device. Examples of the sending device include, but not limited to, a computer; a transceiver (e.g., a modem, network interface card, etc.); a digital camera; a scanner; an image sensor and the like.

In addition, a digital signature is used to ensure that the data could have only originated from a particular signatory. Herein, a "digital signature" is defined as a transformation, under an asymmetric cryptographic scheme, by encrypting data with a private key of the signatory. The data may include (i) data (in its entirety) associated with an image, or (ii) a hash value of that data being the result of the data transferred through a one-way hash function. The digital signature is used to authenticate or verify that the data has not been illicitly modified (compromised) after being digitally signed.

For example, if the digital signature contains data encrypted with the private key of the signatory, an accurate determination may be made as to whether the data has been compromised by decrypting the digital signature with a public key of the signatory and then comparing the data in its non-encrypted format with the data contained in the digital signature. However, if the digital signature contains the hash value encrypted with the private key of the signatory, an accurate determination can be accomplished by transmitting the data in its non-encrypted format through the same one-way hash function to obtain a new hash value, decrypting the digital signature with the public key of the signatory to recover the hash value, and comparing the recovered hash value with the new hash value. In both cases, if there is a match, the data has not been compromised as shown in detail in FIG. 1.

Figure 1:
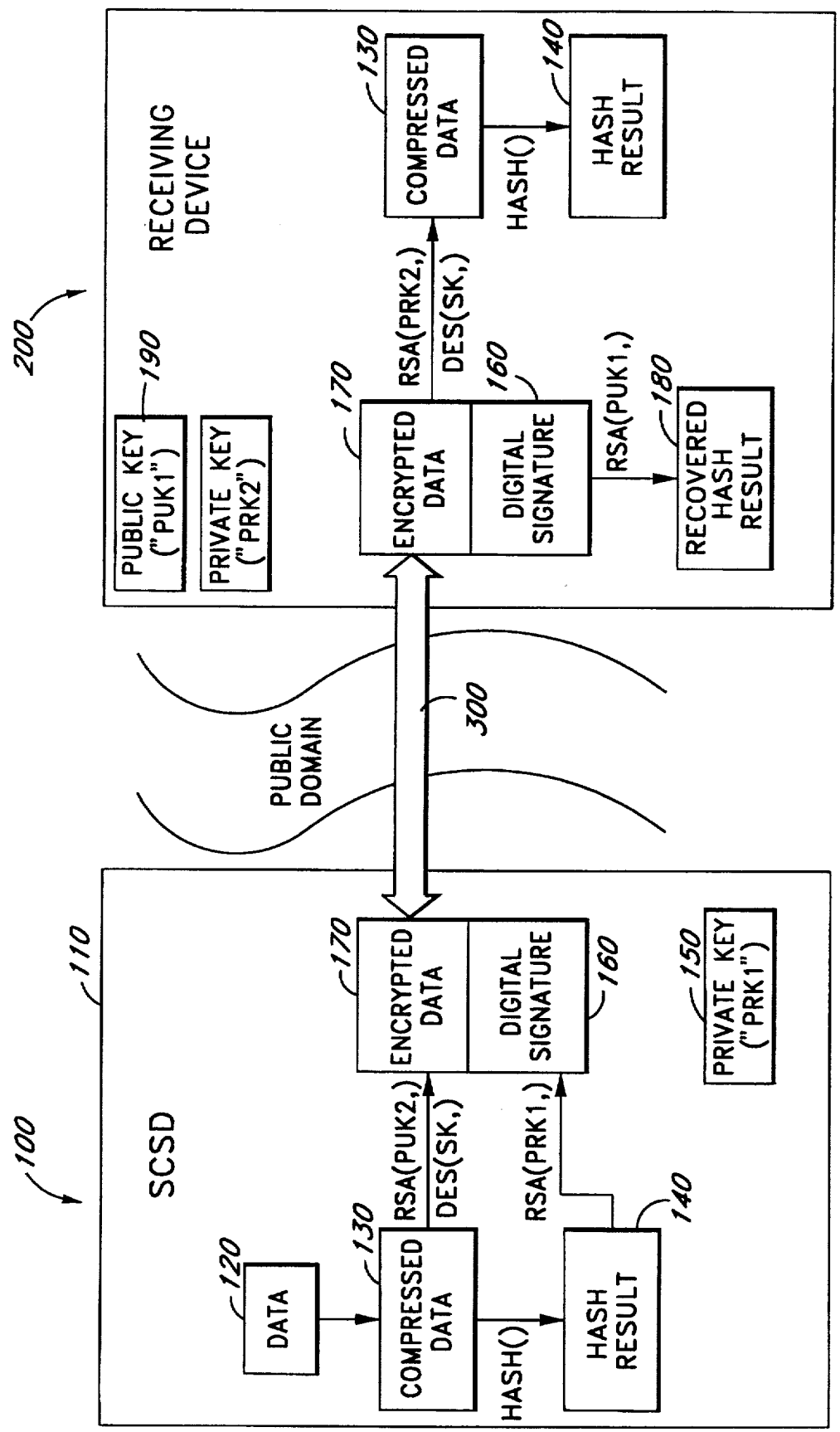
FIG. 1 is an illustrative block diagram of signing operations performed by a secure compressed signing device.

Referring to FIG. 1, an illustrative block diagram of a secure compressed signing device ("SCSD") is shown in which the SCSD is performing compression and other operations on data. Placed within a sending device, the SCSD 100 captures data 120 by generating the data 120 within a physically protected enclosure containing the SCSD 100. This enclosure may include a secure physical barrier 110 as shown which is discussed below.

The SCSD 100 compresses the data 120 to produce compressed data 130. A variety of different compression techniques may be used including but not limited to lossy compression techniques such as Joint Pictures Experts Group ("JPEG") and Moving Pictures Experts Group ("MPEG"). The compressed data 130 is then input into a hash function to produce a hash result 140. The hash result 140 is encrypted using a private key ("PRK1") 150 of the SCSD 100 to produce a digital signature 160. If the data does not have to be secured for privacy, the digital signature 160 may be attached or appended to the compressed data 130 and transmitted to a receiving device 200 via communication link 300. As shown, if the data 120 is confidential data, the compressed data 120 may be encrypted using standard cryptographic techniques such as (i) public/private cryptography using the public key of receiving device ("PUK2") as shown, and/or (ii) symmetric key cryptography using a secret or session key ("SK"). The resultant encrypted data 170 which is transmitted over communication link 300. The communication link 300 may be a telephone line, a networking cable such as "ISDN" or "Ethernet", wireless communication path or any other medium of communication.

Receiving device 200 receives data from the communication link 300 for processing. To authenticate that the data originated from the SCSD 100, if data from the SCSD 100 is encrypted, the receiving device 200 will decrypt the encrypted data 170 using an appropriate key such as the private key ("PRK2") of the receiving device as shown, although the secret or session key ("SK") would be used if symmetric cryptography is utilized. Thus, the receiving device 200 can recover the original compressed data 130 from the encrypted data 170. A recovered hash result 180, supposedly being equivalent to the hash result 140 prior to being digitally signed by SCSD 100, can be obtained by decrypting the digital signature 160 using the public key ("PUK1") 190 of the SCSD 100. By hashing the compressed data 130 to again generate the hash result 140, a comparison is made between the recovered hash result 180 and the hash result 140. If a match occurs, the data is authenticated, ensuring that it was transmitted from the SCSD 100. The compressed data 130 may then undergo decompression or further processing.

By compressing the data and digitally signing the data within the secure physical barrier 110 of the SCSD 100, the difficulty of performing a fraudulent substitution of data during transmission is substantially increased. The physical barrier 110 may include a standard single-chip or multi-chip integrated circuit package. Placing SCSD 100 on a single microchip increases the difficulty of an interloper successfully tampering with the data unbeknownst to the authorized recipient. Finally, the physical barrier 110 may be designed to damage the circuitry inside if its integrity is breached.

Figure 2:
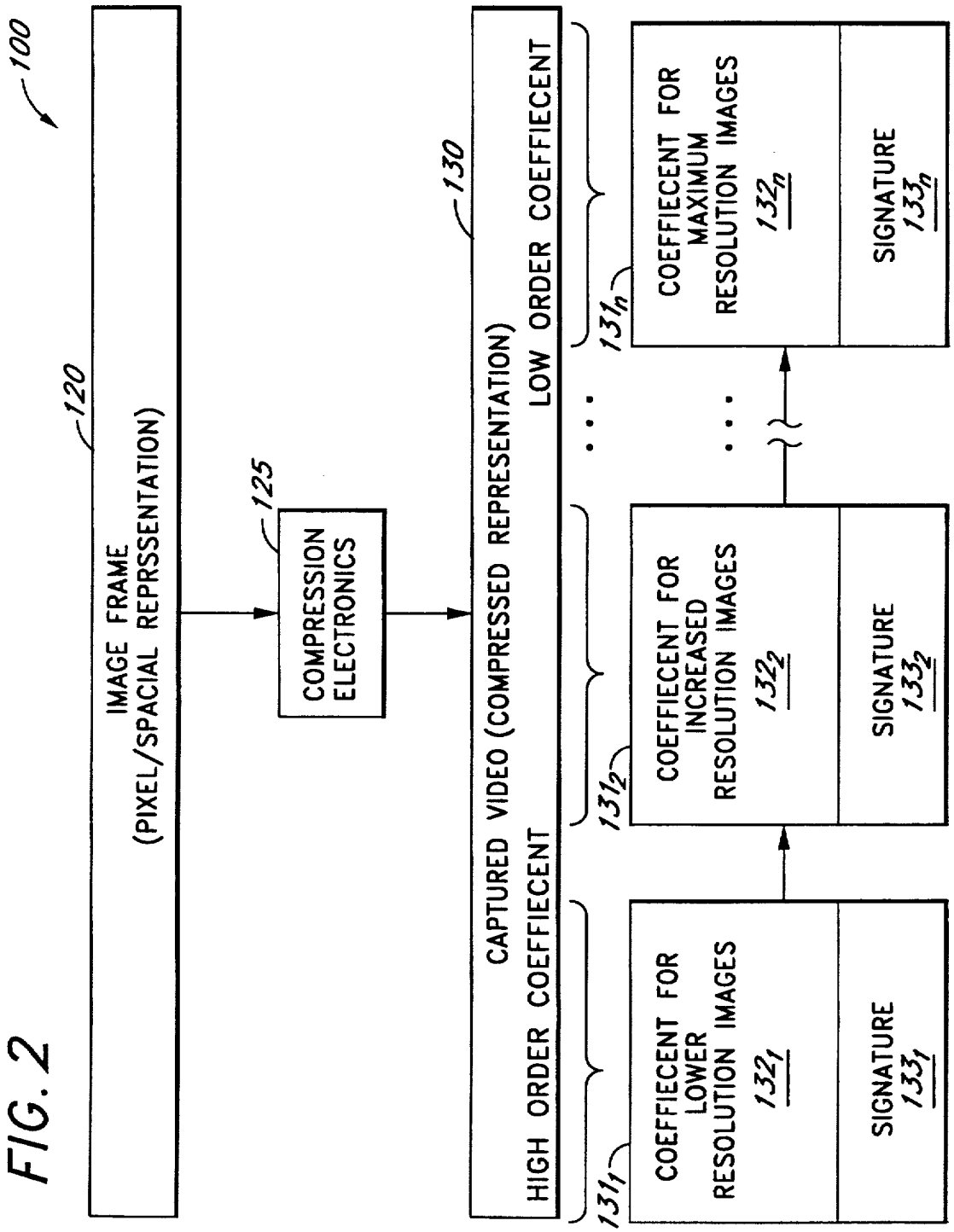
FIG. 2 is an illustrative block diagram of a second embodiment of the secure compressed signing device designed to separately sign sections of coefficients generated in the compression of a captured video image.

A first embodiment of the compression technique to allow authentication of data, even when the transmission of data is incomplete or undergoes lossy compression is shown in FIG. 2. The embodiment shown in FIG. 2 is particularly useful for authenticating progressively imaged video data. The SCSD 100 captures an image frame 120 being the data in FIG. 1. Within the SCSD 100, compression electronics 125 compresses the image frame 120 within the hardware boundaries of the SCSD 100. The resulting compressed representation 130 includes (i) higher order coefficients which are useful for producing the lower resolution image, and (ii) low order coefficients which provide the fine details of the image. An example of a compression technique that produces higher order and lower order coefficients useful for progressive rendering of an image is a discrete cosine transform ("DCT").

The coefficients of the compressed representation 130 may be subdivided into various "n" sections of higher order and lower order coefficients ("n" being a positive whole number, n>1). This "partitioning" of data into appropriate sections allows construction of the image frame at various resolutions depending on how many sections are used in reconstruction. When reconstruction of image frame 120 at a low resolution is sufficient, only sections that contain higher order coefficients (e.g. section $131_1$) are needed. When an image frame with higher resolution is required, additional sections (e.g. sections $131_2$–$131_n$) containing lower order coefficients will be needed.

Each section $131_1$–$131_n$ of coefficients is independently signed so that each section, such as section $131_1$, for example, includes a data portion $132_1$ including the coefficients and a corresponding digital signature portion $133_1$. Receiving a section containing high order coefficients allows the receiving device to reconstruct and authenticate a low resolution image without receiving all of the coefficients of the compressed representation 130.

The division of coefficients into sections, each section having a corresponding digital signature, allows the receiving device to determine the validity of the data for each section. Such verification is valuable if the transmission is truncated or interrupted such that a lower resolution image is received by the receiving device. The described embodiment is particularly useful for JPEG compressed images. Although MPEG does not support "progressive image reconstruction", the technique of compressing and signing the compressed representation of the image frame within the confines of the secure boundaries of the SCSD still provides secure compression while allowing the use of lossy compression techniques.

One disadvantage of the FIG. 2 embodiment is that digital signaturing is a time-consuming process. In particular, each digital signature requires a significant amount of CPU time. Furthermore, each digital signature requires approximately a high number of bits of data (e.g., one thousand bits). The embodiment of the SCSD for compressing digital images shown in FIG. 2 requires multiple digital signatures. Many digital signatures per transmission can increase the amount of data per transmission such that the data space savings which were originally achieved in compression is eliminated.

Figure 3:
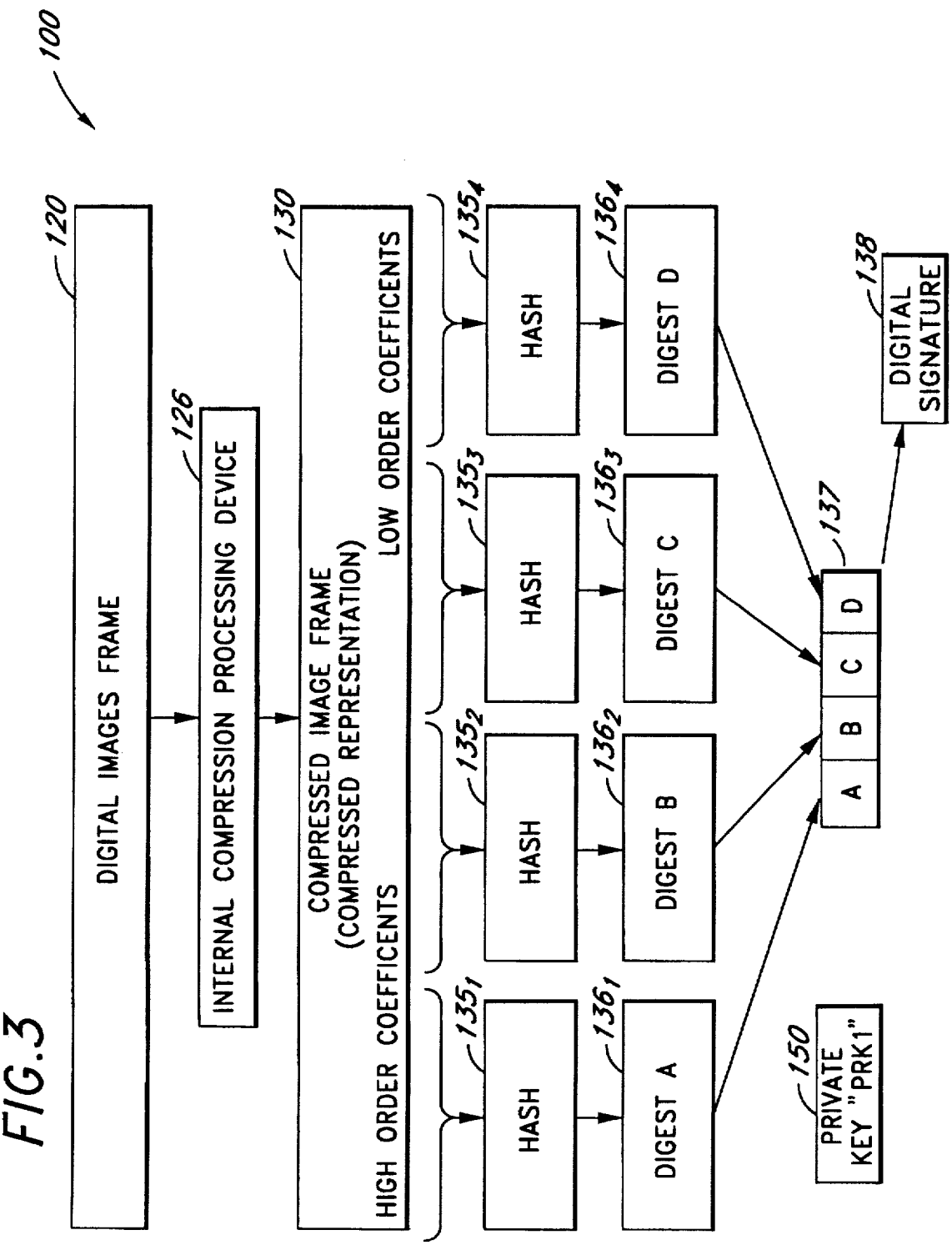
FIG. 3 is an illustrative block diagram showing a preferred embodiment of the transmitting unit of a secure compressed signing device. The pictured embodiment produces a digital hash digest which can be used to verify the source of sections of the compressed image frame.

FIG. 3 is an illustrative block diagram showing another embodiment of the SCSD 100 that allows authentication of individual sections of an image frame, using only one signature. Captured image frame 120 is processed in an internal compression processing device 126 to generate a compressed representation of the image frame 130. The captured image frame is partitioned into a number of sections. In the embodiment, four sections containing lower order coefficients and higher order coefficients are used, although any number of sections may be used. One method of generating such coefficients is using DCT.

Thereafter, each set of coefficients is run through a hashing function $135_1$–$135_4$ to provide hash results $136_1$–$136_4$, respectively. Different hashing functions may be used, including but not limited to Message Digest 5 ("MD5"), a hashing algorithm from RSA Data Security, Inc. of Redwood City, Calif. or Secure Hash Algorithm ("SHA-1") specified by the National Institute of Standards and Technology of Washington, D.C. Each hashing result is a unique digest (digest A $136_1$, digest B $136_2$, digest C $136_3$, digest D $136_4$) corresponding to each partitioned section of coefficients. Thus, in the illustrated embodiment containing four separate sections, the four digests are combined to produce approximately 512 bits of data, provided each digest is approximately 128 bits.

In order to reduce the number of signatures needed, these digests $136_1$–$136_4$ are concatenated together to form a single data set referred to as a hash sequence table 137. The hash sequence table 137 is digitally signed by hashing and encrypting with the private key "PRK1" of the SCSD to produce a digital signature 138 of the hash sequence table 137.

During transmission, the SCSD 100 first sends a copy of the hash sequence table 137 accompanied by its digital signature 138. Thereafter, SCSD 100 transmits data forming the compressed image frame 130.

Figure 4:
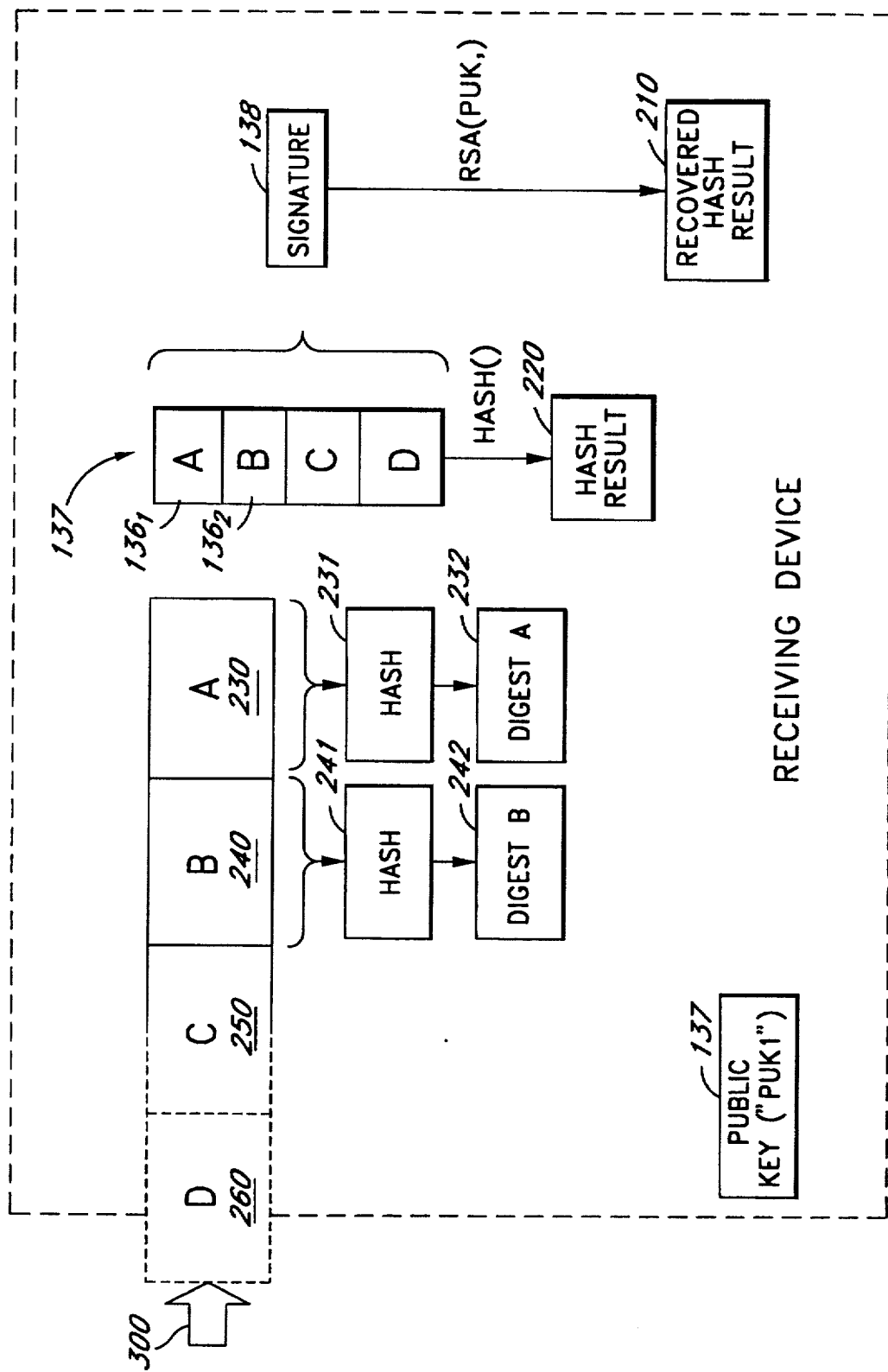
FIG. 4 is an illustrative block diagram of a preferred embodiment of the receiving unit of the secured compressed signing device. The pictured embodiment receives the signals transmitted by the transmitting portion of FIG. 3.

FIG. 4 is an illustrative block diagram showing a receiving device which receives the data transmitted by the SCSD of FIG. 3. The receiving device 200 receives data over communication link 300. The receiving device 200 first authenticates the hash sequence table 137 transmitted over the link 300 by performing operations on digital signature 138. The received digital signature 138 is decrypted using the public key ("PUK1") 190 of the SCSD to recover a hash value 210 for the hash sequence table 137. If the hash value 210 matches the hash result 220 of the hash sequence table 137, the received hash sequence table 137 is authentic.

The receiving device 200 also receives or partially receives the compressed image frame 130. The compressed image frame 130, in the embodiment shown, includes a plurality of image frame coefficients. In the example shown in FIG. 4, only 60% of these coefficients are successfully transmitted before termination of the transmission as indicated by the solid lines. Thus, only section A 230 and section B 240 which represents the first 50% of the data set are totally received, and thus, only the coefficients corresponding to section A 230 and section B 240 can be validated. The receiving device 200 processes the coefficients that correspond to section A 230 by hashing these coefficients with the same hash function 231 originally used by SCSD to generate the digest A as shown in FIG. 3. Thus, if the data is authentic, digest A 232 will match the digest contained in the first portion $136_1$ of the authenticated hash sequence table 137. If the digests do not match, then the receiving device 200 may notify the user that the data is not authentic. Similarly, Section B 240 which includes the coefficients corresponding to the next 25% of the compressed image frame 130 may be hashed through hash function 241 to generate a second digest B 242. Digest B 242 may be compared to the second portion $136_2$ of the authenticated hash sequence table 137 to verify the authenticity of Section B. Because only 60% of all the coefficient was received, the data for section C 280 was not completely transmitted. Thus, the data in section C 280 cannot be authenticated. In other embodiments, smaller sections may be used to allow for smaller units of transmission to be independently verified.

FIG. 5 is a flow chart diagram of the steps taken in one embodiment of the SCSD. First, an image frame is transmitted to the SCSD from other circuitry, possibly from circuitry within the hardware barrier (Step 404). Next, the captured image frame is subsequently compressed (Step 408). In one embodiment, the compression of the image frame generates a set of coefficients. In Step 412, the coefficients representing the compressed image are divided into sections. The coefficients in a particular section are usually interrelated, for example, a section may have all the high order coefficients necessary to generate a low resolution image.

Each section is individually hashed to create a unique corresponding digest (Step 416). These digest sections are concatenated or otherwise combined to form a hash sequence table (Step 420). The hash sequence table is digitally signed (Step 424).

The digital signature of the hash sequence table and the hash sequence table are transmitted to a receiving device prior to the transmission of the compressed image (Step 428). Thus, the digital signature, the hash sequence table and some portion of the coefficients or compressed image are received by the receiving device. At the receiving device, a public key of the SCSD is used to verify the digital signature and authenticate the hash sequence table (Step 432). The receiving device hashes each completely received section of the compressed image (Step 436). If the hashing of each received section matches the corresponding digest in the hash sequence table, the receiving device confirms that the received section of data is authentic (Step 440).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of authenticating a portion of an image, the method comprising the steps of:

compressing an image frame;

dividing the compressed image frame into a plurality of image sections including a first image section and a second image section;

separately digitally signing each of the plurality of image sections to create a digital signature corresponding to each of the plurality of image sections;

transmitting the plurality of image sections and corresponding digital signatures such that at least the first image section and a digital signature corresponding to the first image section are received in their entirety; and authenticating at least the first image section that is received using the digital signature.

2. The method of claim 1 wherein the compressing step is accomplished using a digital cosine transform.

3. The method of claim 2 wherein the dividing step produces said first image section comprises higher order coefficients of the digital cosine transform used to render a low resolution image.

4. The method of claim 3 wherein the dividing step produces the second image section having coefficients of a lower order than the first image section.

5. The method of claim 1 wherein the compressing step produces the compressed image frame as a Joint Picture Experts Group image.

6. The method of claim 1 further comprising the step of encrypting each of the plurality of image sections prior to the transmitting step.

7. A method for authenticating that an image has been transmitted from a sending device to a receiving device, the method comprising the steps of:

compressing the image to form a compressed image;

dividing the compressed image into a plurality of sections;

individually hashing each of the plurality of sections to produce a corresponding plurality of digest elements;

combining the plurality of digest elements to produce a hash sequence table;

digitally signing the hash sequence table to generate a hash sequence table signature;

transmitting the hash sequence table signature, the hash sequence table and the plurality of sections;

authenticating the hash sequence table using the hash sequence table signature; and authenticating at least one section of the compressed image by hashing the at least one section to produce a digest and comparing the digest with a corresponding digest element from the hash sequence table.

8. The method of claim 7 wherein said compressing step generates a plurality of discrete cosine transform coefficients.

9. The method of claim 8 wherein the dividing step includes the steps of separating the compressed image into the plurality of sections based on a resolution order of the plurality of discrete cosine transform coefficients.

10. The method of claim 7 wherein the combining step includes the step of concatenating the plurality of digest elements.

11. The method of claim 7 wherein the step of digitally signing the hash sequence table includes the steps of hashing the hash sequence table to produce a first hash result; and encrypting the first hash result using a private key associated with the sending device.

12. The method of claim 11 wherein said step of authenticating said hash sequence table includes the steps of decrypting the hash sequence table signature to using a public key of the sending device to recover the first hash result;

hashing the hash sequence table to produce a second hash result; and comparing the first hash result and the second hash result.

13. A system for verifying the authenticity of a compressed digital image, the system comprising:

a communication link;

a sending device coupled to the communication link, the sending device including a secure compressed signing device including (i) compression circuitry to compress a digital image to produce a compressed image, (ii) a partitioning circuit to partition the compressed image into a plurality of image sections, (iii) a hash circuit to hash each of the plurality of image sections and output a plurality of digests to be concatenated together to generate a hash sequence table, and (iv) a signing circuit to digitally sign said hash sequence table to produce a hash sequence table signature; and a receiving device configured to authenticate at least one image section of the plurality of image sections received in its entirety from the sending device by using the at least one image section, the hash sequence table signature, and the hash sequence table.

14. The system of claim 13 wherein the secure compressed signing device is fully contained within an integrated circuit package.

15. The system of claim 13 wherein said secure compressed signing device encrypts said plurality of image sections before transmission through said communications link.

16. The system of claim 13 wherein said receiving device uses a public key of the secure compressed signing device to verify the authenticity of the hash sequence table through use of the hash sequence table signature.

17. A method of forming a concatenated signed hash sequence table used for verifying the authenticity of a portion of an image frame when transmission of the image frame is interrupted or causes alterations of the image frame, said method comprising the steps of:

partitioning the image frame into a plurality of image sections;

hashing each section in said plurality of image sections to generate a corresponding plurality of hash values;

concatenating the hashed values to produce a hash sequence table; and signing digitally the hash sequence table to form a hash sequence table signature that can be used to authenticate a portion of the image frame that contains valid data.

18. The method of claim 17 further comprising the step of compressing the image frame prior to partitioning the image frame.

19. The method of claim 18 wherein the compressing step generates a plurality of discrete cosine transform coefficients.

20. The method of claim 19 wherein the partitioning step includes the step of separating the image sections based on ordering of the discrete cosine transform coefficients.

* * * * *